(12) United States Patent
Christensen et al.

(10) Patent No.: US 8,188,715 B2
(45) Date of Patent: May 29, 2012

(54) METHOD FOR DETERMINING EXTENT AND TYPE OF CAPACITY FADE

(75) Inventors: John F. Christensen, Mountain View, CA (US); Jasim Ahmed, Mountain View, CA (US); Mario Roessler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 448 days.

(21) Appl. No.: 12/466,707

(22) Filed: May 15, 2009

(65) Prior Publication Data

US 2010/0291417 A1    Nov. 18, 2010

(51) Int. Cl.
*H02J 7/00* (2006.01)
(52) U.S. Cl. .............................. 320/118; 429/50; 429/60
(58) Field of Classification Search .................. 320/118; 324/427; 429/50, 90
See application file for complete search history.

(56) References Cited

U.S. PATENT DOCUMENTS

| | | | |
|---|---|---|---|
| 5,369,364 A | 11/1994 | Renirie et al. | |
| 7,029,796 B2 | 4/2006 | Choi et al. | |
| 7,041,239 B2 * | 5/2006 | Barker et al. | 252/521.5 |
| 2008/0003490 A1 * | 1/2008 | Christensen et al. | 429/61 |
| 2008/0050644 A1 * | 2/2008 | Christensen et al. | 429/50 |
| 2010/0285363 A1 * | 11/2010 | Christensen et al. | 429/231.95 |

FOREIGN PATENT DOCUMENTS

| | | |
|---|---|---|
| WO | 2008002626 | 1/2008 |
| WO | 2008026525 | 3/2008 |

OTHER PUBLICATIONS

Christensen, J.F., Failure mechanisms in lithium-ion batteries, Ph.D. dissertation, University of California, Berkeley, 2005.*
NEC Research and Development, vol. 41, No. I, Jan. 2000, Prismatic Lithium-Ion Rechargeable Battery with Manganese Spinel and Nickel-Cobalt Oxide Cathode.*
NEC Research and Development, vol. 41, No. I, Jan. 2000, Advantages of Blended Electrode for Lithium-Ion Rechargeable Batteries.*
Sikha et al., "Effect of Porosity on the Capacity Fade of a Lithium-Ion Battery," Journal of the Electromechanical Society, vol. 151 (7), Jun. 14, 2004, pp. A1104-A1114 (11 pages).

(Continued)

*Primary Examiner* — Melissa Koval
*Assistant Examiner* — Daniel Miller
(74) *Attorney, Agent, or Firm* — Maginot, Moore & Beck

(57) ABSTRACT

A method of determining extent and type of capacity fade of an electrochemical cell in one embodiment includes identifying a first volume fraction of an active material in an electrode, identifying a first capacity of the first electrode at another time, identifying a second volume fraction of the first active material based upon the first capacity, identifying a first amount of the first active material lost from the first time to the second time based upon the first volume fraction and the second volume fraction, identifying a third volume fraction of an active material in another electrode, identifying a second capacity of the second electrode at a later time, identifying a fourth volume fraction of the second active material based upon the second capacity, and identifying a second amount of the second active material lost based upon the third volume fraction and the fourth volume fraction.

17 Claims, 3 Drawing Sheets

OTHER PUBLICATIONS

Zhang et al., "Calendar life study of Li-ion pouch cells Part 2: Simulation," Journal of Power Sources, vol. 179, Jan. 22, 2008, pp. 785-792 (8 pages). Zhang et al., "Capacity fade analysis of a lithium ion cell," Journal of Power Sources, vol. 179, Jan. 21, 2008, pp. 793-798 (6 pages).

Ramadass et al., "Capacity fade of Sony 18650 cells cycled at elevated temperatures Part II. Capacity fade analysis," Journal of Power Sources, vol. 112 (2002), pp. 614-620 (7 pages).

Ning et al., "Capacity fade study of lithium-ion batteries cycled at high discharge rates," Journal of Power Sources, vol. 117 (2003), pp. 160-169 (10 pages).

Schmidt et al., "Model-based distinction and quantification of capacity loss and rate capability fade in Li-ion batteries," Journal of Power Sources, vol. 195 (2010), pp. 7634-7638 (5 pages).

International Search Report in corresponding PCT application (i.e., PCT/US2010/034080), dated Jul. 30, 2010 (5 pages).

Abu-Sharkh et al., "Rapid test and non-linear model characterization of solid-state lithium-ion batteries," Journal of Power Sources, 130 (2004) 266-274 (9 pages).

Bloom et al., "Differential voltage analyses of high-power, lithium-ion cells 1. Technique and application," Journal of Power Sources, 139 (2005) 295-303 (9 pages).

Christensen et al., "Effect of Anode Film Resistance on the charge/discharge capacity of a lithium-ion battery," Journal of the Electrochemical Society, 150 (2003) A1416-A1420 (5 pages).

Christensen et al., "Cyclable Lithium and Capacity Loss in Li-Ion Cells," Journal of the Electrochemical Society, 152 (4) A818-A829 (2005) (12 pages).

Doeff et al., "Electrochemical and structural characterization of titanium-substituted manganese oxides based on NaO.44MnO2," Thesis, Lawrence Berkeley National Laboratory, University of California, 2004, 33 pages.

Ramadass et al., "Mathematical modeling of the capacity fade of Li-ion cells," Journal of Power Sources, 123 (2003), 230-240 (11 pages).

Shim et al., "The Lithium/Sulfur Rechargeable Cell, Effects of Electrode Composition and Solvent on Cell Performance," Journal of the Electrochemical Society, 149 (10) A1321-A1325 (2002), (5 pages).

* cited by examiner

METHOD FOR DETERMINING EXTENT AND TYPE OF CAPACITY FADE

FIELD OF THE INVENTION

This invention relates to battery systems and more particularly to battery systems incorporating cells which exhibit capacity fade over the life of the system.

BACKGROUND

A number of new battery chemistries are entering the market to provide capabilities required in specialized applications. At one time, the lithium-ion battery market was driven by the use of such batteries in portable electronics which require high energy but only limited life and power. More recently, other industries have focused on the use of batteries. By way of example, batteries are commonly incorporated into power tools and certain types of hybrid-electric vehicles. Each new industry requires different performance characteristics. Certain applications such as automotive applications require battery stability both in terms of battery safety for large packs and long life (at least 10 to 15 years).

Over the life of electrochemical cells, capacity can be lost due to side reactions and/or active material loss. Cell capacity is defined herein as the capacity of the cell between two particular cell voltages (e.g., 2.8 V and 4.1 V). The change in capacity usually results in changes in the relationship between the open cell potential (OCP) and capacity of the cell. The change in the relationship becomes problematic in that the OCP of a cell is a convenient measure of the state of charge (SOC) of the cell so long as the relationship between the OCP and the capacity of the cell is known.

A full discharge of a cell can be used to periodically establish the relationship between the OCP of a cell and the SOC of the cell. The opportunity to fully discharge a cell, however, is not readily available for various cell usages. By way of example, the entire available capacity range of the battery is not accessed during normal operation of a hybrid-electric vehicle. Moreover, it is inconvenient to interrupt operation of a vehicle merely to fully discharge a battery in order to diagnose the remaining capacity of the battery cells.

An article, *Bloom*, et al., "Differential voltage analyses of high-power, lithium-ion cells: 1. Technique and application," Journal of Power Sources, 139 (2005) 295, discusses a technique wherein low-rate measurements of cell voltage as a function of capacity could be used to determine the dominant contributors to capacity fade in a battery. The technique involves differentiation of the discharge voltage-vs.-capacity curves of a cell in order to obtain recognizable signatures that indicate the relative states of charge of the positive and negative electrodes. This technique, however, is limited in precision.

What is needed therefore is a method of determining the extent and type of capacity fade in a dual intercalation battery (e.g., a lithium-ion battery). A further need exists for a method which allows determination of the capacity of a battery when only a limited capacity or state-of-charge range is sampled. Additionally, the ability to more precisely identify features contributed by individual electrodes would be beneficial.

SUMMARY

In accordance with one embodiment, a method of determining extent and type of capacity fade of an electrochemical cell in one embodiment includes identifying a first volume fraction of a first active material in a first electrode at a first time, identifying a first capacity of the first electrode at a second time, identifying a second volume fraction of the first active material based upon the first capacity, identifying a first amount of the first active material lost from the first electrode from the first time to the second time based upon the first volume fraction and the second volume fraction, identifying a third volume fraction of a second active material in a second electrode at about the first time, identifying a second capacity of the second electrode at about the second time, identifying a fourth volume fraction of the second active material based upon the second capacity, and identifying a second amount of the second active material lost from the second electrode from about the first time to about the second time based upon the third volume fraction and the fourth volume fraction.

In accordance with another embodiment, a method of determining extent and type of capacity fade of an electrochemical cell includes quantifying a first change in the volume fraction of active material in a negative electrode, quantifying a second change in the volume fraction of active material in a positive electrode, comparing the first change and the second change, and determining a side reaction loss based upon the comparison.

DESCRIPTION

Figure 1:
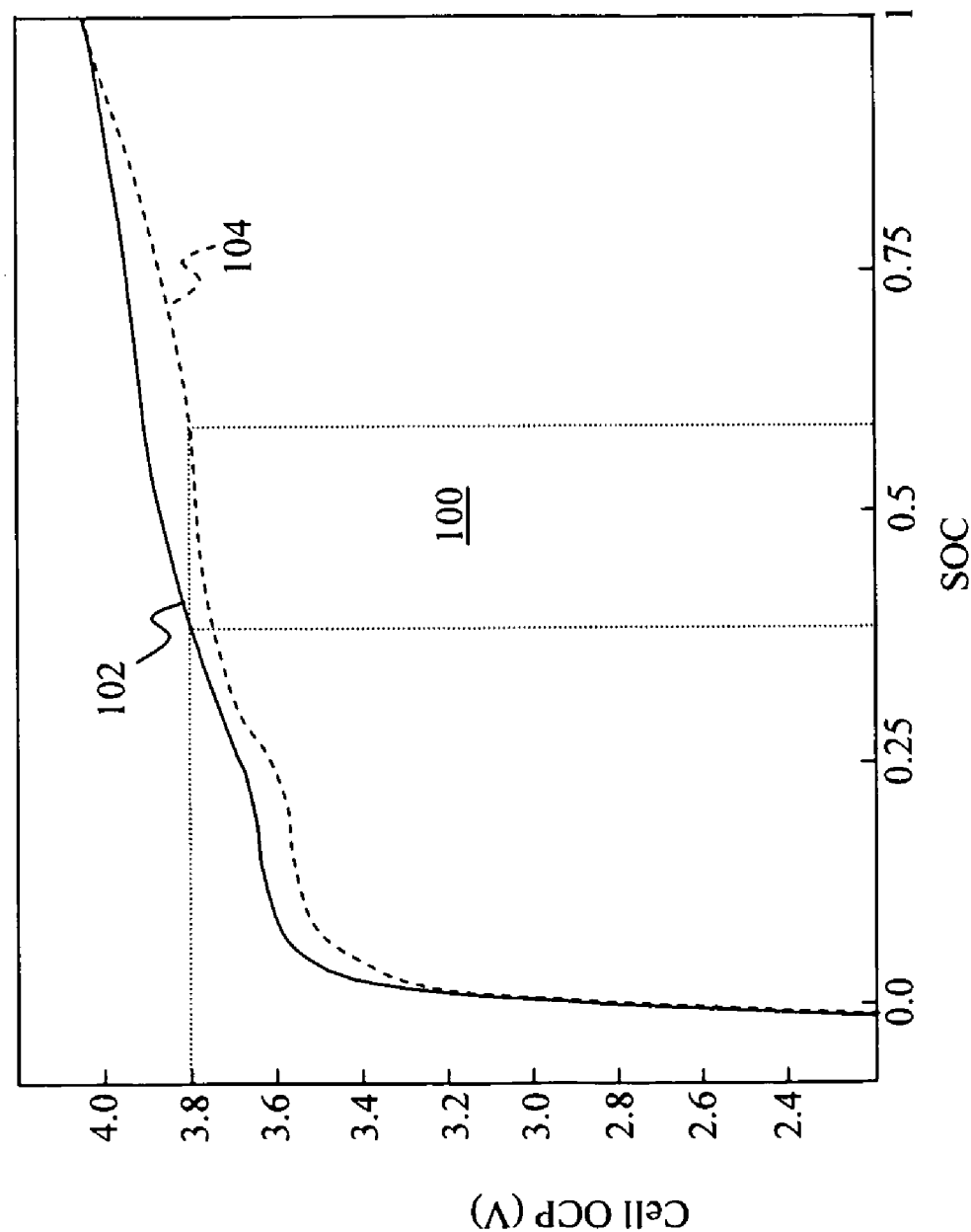
FIG. 1 depicts a graph of the $OCP_O/SOC_O$ relationship for an exemplary cell along with the $OCP_A/SOC_A$ relationship for the exemplary cell after the exemplary cell has been operated for a number of cycles.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

FIG. 1 shows a graph 100 of the relationship between the open cell potential (OCP) of an electrochemical cell and the state of charge (SOC) of the cell. The line 102 identifies the relationship between the OCP and the SOC of the cell at an earlier time of life while the line 104 identifies the relationship between the OCP and the SOC of the cell at a later time of life. The relationship between the OCP and the SOC for the cell represented by the lines 102 and 104 is the cumulative result of the contribution of each of the active materials within a cell to the SOC of the cell. A cell will have at least two active materials, with one active material in each electrode. Electrodes may further be blended with two or more active materials to provide desired operational characteristics.

As evidenced by the graph 100, the relationship between OCP and SOC for the cell changes over time. Thus, while an OCP of 3.8 volts is associated with a SOC of about 39% at the time of life represented by the line 102, the same voltage is associated with a SOC of about 58% at the time of life represented by the line 104. The 19 percent difference indicates that the exemplary cell has experienced capacity fade. Moreover, the shape of the line 102 is different from the shape of the line 104. For example, at 3.8 volts, the slope of the line 102 is greater than the slope of the line 104. The differences in the shape of the lines 102 and 104 reflect changing contributions to the SOC of the various active materials over the life of the cell.

The data available in the graph 100 may be used to further understand the nature of the capacity fade if the capacity of the cell is known. In particular, the capacity of the cell ($C_{Cell}$) at any given time is given by:

$$C_{Cell} = \hat{C}_{Cell} L_{Cell} \epsilon_{Cell} \rho_{Cell} (SOC_{max} - SOC_{min}),$$

where $\hat{C}_{Cell}$ is the cell specific capacity,
$\epsilon_{Cell}$ is the volume fraction of active material in the cell,
$\rho_{Cell}$ is the density of the active material in the cell, and
$L_{Cell}$ is the thickness of the electrodes in the cell.

Of the foregoing, $\hat{C}$, L, and $\rho$ can be assumed to be invariant. Accordingly, if the original capacity of the cell is known, and the capacity of the cell at a later time along with the OCP/SOC relationship of the cell is known, the active material loss (AML) can be determined by resolving the foregoing equation such that:

$$AML = 1 - \frac{\varepsilon_A}{\varepsilon_O}$$

where $\epsilon_O$ and $\epsilon_A$ are the earlier and later volume fraction of active material in the cell, respectively.

By further identifying the capacities and the OCP/SOC relationships of each of the electrodes within a cell, even greater insight into the internal processes of the exemplary cell may be obtained using the foregoing equations. For example, the capacity ($C_{pos}$) of the positive electrode of the cell at any given time is given by:

$$C_{pos} = \hat{C}_{pos} L_{pos} \epsilon_{pos} \rho_{pos} (y_{max} - y_{min}),$$

where $\hat{C}_{pos}$ is the positive-electrode specific capacity,
$\epsilon_{pos}$ is the volume fraction of active material in the positive electrode,
$\rho_{pos}$ is the density of the positive-electrode active material,
$L_{pos}$ is the thickness of the positive electrode,
$y_{max}$ is the maximum SOC of the positive electrode, and
$y_{min}$ is the minimum SOC of the positive electrode.

Similarly, the capacity ($C_{neg}$) of the negative electrode of the cell at any given time is given by:

$$C_{neg} = \hat{C}_{neg} L_{neg} \epsilon_{neg} \rho_{neg} (x_{max} - x_{min}),$$

From the two foregoing relationships, the volume fraction of active material may be determined if the capacities of the respective electrodes and the respective state of charge ranges are known and with the assumption that $\hat{C}$, L and $\rho$ are invariant. Given the foregoing, the positive-electrode active-material loss ($AML_{pos}$) and negative-electrode active-material loss ($AML_{neg}$) at a given time are:

$$AML_{pos} = 1 - \frac{\varepsilon_{pos}}{\varepsilon_{pos0}}, \text{ and}$$

$$AML_{neg} = 1 - \frac{\varepsilon_{neg}}{\varepsilon_{neg0}},$$

where $\epsilon_{pos0}$ and $\epsilon_{neg0}$ are the earlier active-material volume fractions of the positive and negative electrodes, respectively.

The definition of capacity loss due to side reactions or other changes in capacity such as active material that becomes isolated from the electrodes depends upon whether more active material has been lost from the negative or positive electrode. If $AML_{pos}$ exceeds $AML_{neg}$, then the side-reaction loss (SRL) is $$SRL = 1 - \frac{y_{max} - y_{min}}{y_{max,0} - y_{min,0}},$$

where $y_{max,0}$ and $y_{min,0}$ are the initial SOC bounds for the positive electrode.

Similarly, if $AML_{neg}$ exceeds $AML_{pos}$, then $$SRL = 1 - \frac{x_{max} - x_{min}}{x_{max,0} - x_{min,0}},$$

where $x_{max,0}$ and $x_{min,0}$ are the initial SOC bounds for the negative electrode.

Accordingly, the overall capacity ratio (present capacity ($C_A$) divided by initial capacity ($C_O$)) is given by $$\frac{C_A}{C_0} = (1 - SRL)[1 - \max(ARL_{pos}, ARL_{neg})].$$

Thus, once the change in capacity of each of the electrodes in a cell is identified, the OCP/SOC relationship of an aged cell compared to the OCP/SOC relationship of the cell before aging can provide useful insight into the extent and type of capacity fade in a dual intercalation battery (e.g., a lithium-ion battery). The initial OCP/SOC relationship of an intercalation battery is easily obtained. If desired, actual values for the OCP at full charge and full discharge may be measured. Alternatively, the intrinsic thermodynamic properties of the cell materials can be used to provide the initial OCP/SOC relationship if the initial design parameters of $\hat{C}$, $\epsilon$, L, and $\rho$ are known. Alternatively, the current discharged during a complete discharge of the cell can be measured to obtain the capacity of the cell.

Establishing the capacity and OCP/SOC relationship of an aged cell can be accomplished in a similar manner. In an operational cell, however, establishing the proper conditions to obtain the values can be problematic as discussed above. Accordingly, an aged OCP/SOC relationship in one embodiment is established using the procedure of FIG. 2.

Figure 2:
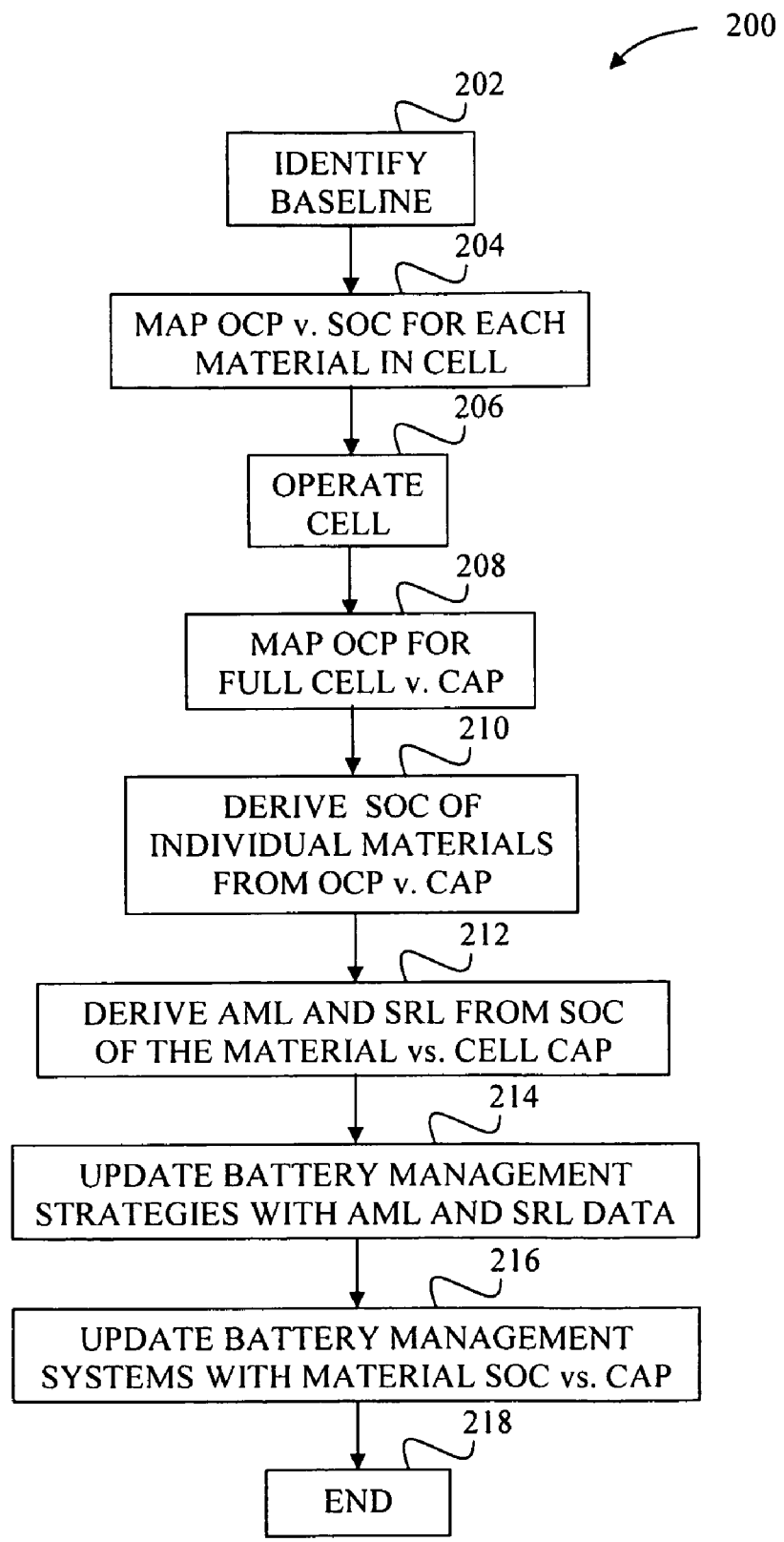
FIG. 2 depicts a flow chart of a procedure which may be used to determine the extent and type of capacity fade in a battery system in accordance with principles of the present invention.

FIG. 2 depicts a procedure 200 for determining, for an intercalation cell, the extent of capacity fade, and the type of capacity fade, wherein the type of capacity fade is categorized as positive-electrode active-material loss, negative-electrode active-material loss, and side-reaction loss. The procedure 200 begins at block 202 which may be prior to initial use of a cell. Initially, the relationship between the OCP ($OCP_O$) and the SOC ($SOC_O$) is determined for each material used in both electrodes of the cell (block 204).

The intrinsic thermodynamic relationships between the $OCP_O$ and $SOC_O$ for each electrode are dependent upon material properties which do not typically change. Exceptions can occur in materials whose crystal structure can change during cell use. Furthermore, the OCP-SOC relationship for a blended electrode, i.e., an electrode with more than one active material, can change over time (e.g., if active material of one type is destroyed to a greater extent than the other type); hence OCP-SOC data must be obtained for each active material used in a blended electrode. For the purposes of this example, the exemplary cell discussed in reference to the procedure 200 incorporates a crystal structure that does not change and neither the negative nor the positive electrode is a blended electrode.

After the cell has been in use (block 206), the relationship between the aged OCP ($OCP_A$) of the full cell and the aged capacity ($C_A$) of the cell is mapped (block 208). Various procedures may be used to obtain the relationship between the $OCP_A$ and the $C_A$ of the cell. In one approach, the cell is slowly discharged a fraction of its full capacity while measuring current output. After allowing the cell to relax, which can take on the order of one day, the $OCP_A$ value for the remaining cell capacity may be obtained. The foregoing steps are repeated until the $OCP_A$ for the capacity range of interest has been measured. For cells that exhibit open-circuit hysteresis, the procedure is repeated for the charge curve. This mapping procedure, while one of the more accurate procedures, is very time consuming.

An alternative approach to mapping the relationship between the $OCP_A$ of the cell and the $C_A$ of the cell is to slowly discharge and recharge the cell (e.g., at C/50, depending upon the impedance of the battery). The values obtained over the discharge/charge cycle are then averaged to obtain an estimate of the $OCP_A/C_A$ relationship. This approach does not account for hysteresis. Thus, for cells which exhibit different charge/discharge relationships, such as two-phase materials, like $LiFePO_4$ which exhibits different diffusivities on charge and discharge, some inaccuracies are realized.

A further alternative for mapping the $OCP_A/C_A$ relationship is to charge and discharge the cell at several different rates, generating a curve for both charge and discharge. The obtained curves are then extrapolated to zero current. This approach accounts for asymmetric battery impedance, but may not account for hysteresis. Some inaccuracies may be realized, however, since the relationship between current and the difference between the $OCP_A$ and the $OCP_O$ may not be precisely linear, even at very low current flow. For cells without open-circuit hysteresis, the average of the two extrapolated curves may be used to obtain the $OCP_A/C_A$ relationship.

In one of the quickest approaches, the cell is discharged a fraction of its capacity, and allowed to relax for a short time (e.g., 90 seconds). The shape of the voltage decay curve (the change in the measured OCP versus time) is then used to estimate the $OCP_A$. The fit that is used may be exponential or a series of exponential forms. Other functional forms may be used to fit the data to provide more accuracy in the $OCP_A/C_A$ estimate.

The time segment that is fit to the exponential curve in this fast approach depends upon cell chemistry and state of charge. Typically the first several seconds of the relaxation is not used in the fitting procedure. The foregoing steps are then repeated to cover the capacity range of interest or the capacity range to which the data is limited by operational constraints. While the voltage decay curve obtained through this approach does not strictly follow a given functional form, the result may be close enough to derive a sufficiently good approximation of the $OCP_A/C_A$ relationship. In systems where hysteresis is negligible, the average of the charge and discharge curves may be used. Alternatively, if the hysteresis as a function of the SOCs of individual half cells has previously been measured, the previously measured value may be used.

Finally, a physical model of the electrochemical cell can be used to estimate the $OCP_A/C_A$ relationship from a history of measurements of the cell voltage and current.

Once the $OCP_A/C_A$ data has been identified, the data may be filtered to reduce noise and/or charge/discharge curves may be averaged as desired. Next, various SOC parameters for each material in the aged cell are derived from the data (block 210) using the thermodynamic $OCP_O/SOC_O$ relationships determined at block 204 for the materials in the two electrodes. Once the aged SOC ($SOC_A$) parameters are derived, the $SOC_A$ parameters may be used to define the $OCP_A/SOC_A$ relationship for the cell.

Derivation of the $SOC_A$ parameters used to define the $OCP_A/SOC_A$ relationship begins by defining the OCP for each of the electrodes as:

$$OCP_{neg} = OCP_{neg}(x), \text{ and}$$

$$OCP_{pos} = OCP_{pos}(y),$$

where x is the SOC of the negative electrode and y is the SOC of the positive electrode. Accordingly, the OCP of the aged cell across both electrodes ($OCP_A$) is:

$$OCP_A = OCP_{Apos}(y) - OCP_{Aneg}(x)$$

Next, the $OCP_A$ as a function of $C_A$ is defined to be $V(C_A)$. Additionally, the remaining capacity of the cell at the OCP at which the OCP data measurement was initiated (block 208) is defined as $C_1$, and the remaining capacity of the cell at the OCP at which the OCP data measurement was terminated (block 208) is defined as $C_2$. The value of $C_1$ should be greater than the value of $C_2$. Accordingly, if a discharge segment was followed by a charge segment in the data, then $C_1$ defined as the capacity at the end of the charge segment, and $C_2$ is defined as the capacity at the end of discharge segment.

With the foregoing convention, the total available capacity of the aged cell ($C_A$), $C_1$, and $C_2$ may be used to define a dimensionless factor ($\theta$) as:

$$\theta = \frac{C_A - C_2}{C_1 - C_2}$$

Accordingly, because the relationship between i) the $SOC_A$, ii) the SOC at the initiation of the OCP data measurement ($SOC_1$), and iii) the SOC at the termination of the OCP data measurement ($SOC_2$) follows the relationship of $C_A$, $C_1$, and $C_2$, the factor $\theta$ may be used to define the $SOC_A$ for each of the electrodes as:

$$x = x_2 + \theta(x_1 - x_2), \text{ and}$$

$$y = y_2 + \theta(y_1 - y_2),$$

where $x_1$ is the negative-electrode SOC corresponding to cell capacity $C_1$,
$x_2$ is the SOC corresponding to $C_2$,
$y_1$ is the positive-electrode SOC corresponding to cell capacity $C_1$, and
$y_2$ is the SOC corresponding to $C_2$.

The parameters $x_1$, $x_2$, $y_1$, and $y_2$ are thus determined by fitting the estimated or measured $OCP(C_A)$ and $V(C_A)$ relationship downward from values dependent upon material properties. Hence, a relationship between $x_A$, $y_A$, and $C_A$ is uniquely determined for the particular point in the life of the cell. Furthermore, $SOC_A$ can be determined as a function of $C_A$ (or $x_A$ or $y_A$) even outside the range of measurement, according to the above definition of $OCP_A$.

By tracking the above defined relationships as the cell ages, the data needed to identify the extent of side reaction and active material loss can be determined. First, the lower cutoff voltage is defined to be $OCP_{min}$ and the upper cutoff voltage is defined to be $OCP_{max}$. The SOC of each electrode at these voltages can be determined using the inverse of the definition of $OCP_A$ discussed above, resulting in the following equation:

$$x = x_2 + \frac{y - y_2}{y_1 - y_2}(x_1 - x_2).$$

The x or y term in the foregoing equation may be eliminated by using the definition of the SOC for the other of the electrodes discussed above.

Next, the maximum and minimum SOC values for each of the electrodes is defined as follows:

$$y_{min} = y(OCP_{max}),$$

$$y_{max} = y(OCP_{min}),$$

$$x_{min} = x(OCP_{min}), \text{ and}$$

$$x_{max} = x(OCP_{max}).$$

Once the SOC data for each of the materials in the cell is identified, the extent of side reaction loss and active material loss can be derived from the SOC of the individual materials and the cell capacity (block 212). Data needed to identify the extent of side reaction and active material loss can be derived using the equations:

$$C_{pos} = \hat{C}_{pos} L_{pos} \epsilon_{pos} \rho_{pos} (y_{max} - y_{min}), \text{ and}$$

$$C_{neg} = \hat{C}_{neg} L_{neg} \epsilon_{neg} \rho_{neg} (x_{max} - x_{min}).$$

Once the AML and SRL data is available, battery management strategies are modified based upon the updated data (block 214). Additionally, the updated relationship between the SOC of the individual materials the in the cell and the capacity of the full cell may be used to update battery management system models (block 216). The process may then be terminated at block 218.

Figure 3:
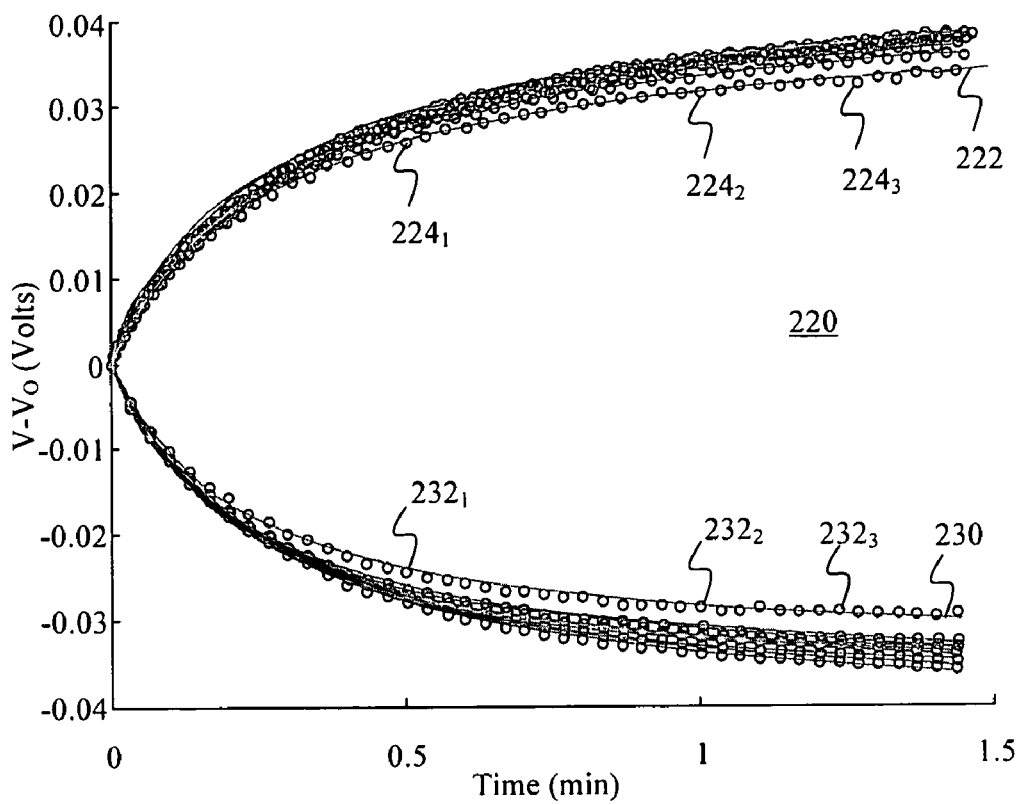
FIG. 3 depicts a graph of the relaxation voltage of an exemplary cell obtained in accordance with the procedure of FIG. 2 showing various curves used to obtain a best-fit of the data.

The process of FIG. 2 was verified by initially obtaining voltage relaxation data from a cell in which current was applied or discharged for a short time and the cell was then allowed to relax toward its $OCP_A$. After the relaxation, the current was again applied or discharged. In this way, the voltage relaxation data was collected at several different SOCs, on both charge and discharge cycles. The voltage relaxation data obtained is depicted in FIG. 3. The graph 220 depicts the change in cell voltage over time from the beginning of relaxation. The collected data are identified by circles and best fit curves are shown for the various data sequences.

By way of example, curve 222 is a best fit curve for data points 224$_x$. The data points 224$_x$ were obtained after a discharge cycle, with data point 224$_1$ obtained about 0.5 second after termination of discharge and data point 224$_2$ obtained about 1 second after termination of discharge. The data points 224$_x$ show that initially after termination of a discharge, the cell OCP rises fairly rapidly. By about 90 seconds, however, the change between successive data points 224$_x$ is relatively small, and the zero current value of the cell may be accurately determined using the curve 222.

Similarly, curve 230 is a best fit curve for data points 232$_x$. The data points 232$_x$ were obtained after a charge cycle, with data point 232$_1$ obtained about 0.5 second after termination of discharge and data point 232$_2$ obtained about 1 second after termination of discharge. The data points 232$_x$ show that initially after termination of a discharge, the cell OCP drops fairly rapidly. By about 90 seconds, however, the downward drift of the data points 232$_x$ is relatively small, and the zero current value of the cell may be accurately determined using the curve 230.

A model was then used to simulate voltage relaxation data for a lithium-ion cell with typical parameters. Noise was added to the data in order to simulate actual data. Results of the simulation are depicted in the graph 240 of FIG. 4. Graph 240 depicts data points 242$_x$ derived from the graph 220. The data points 242$_x$ were used to derive the curve 244, defining a relationship between $OCP_A$ and $SOC_A$. The curve 246 depicts the actual relationship between the modeled $OCP_A$ and $SOC_A$ with the values of $x_{min}$, $x_{max}$, $y_{min}$, and $y_{max}$ set to 0.21, 0.3611, 0.6459, and 0.7368, respectively.

The slight difference between the curve 244 and the curve 246 indicates that the estimated $OCP_A/SOC_A$ relationship using the procedure of FIG. 2 was very accurate even though data was only collected between about 65% SOC and 82% SOC. The best-fit values determined by the algorithm for $x_{min}$, $x_{max}$, $y_{min}$, and $y_{max}$ were 0.2099, 0.3638, 0.6502, and 0.7407, respectively, giving an error of less than 1%.

Figure 4:
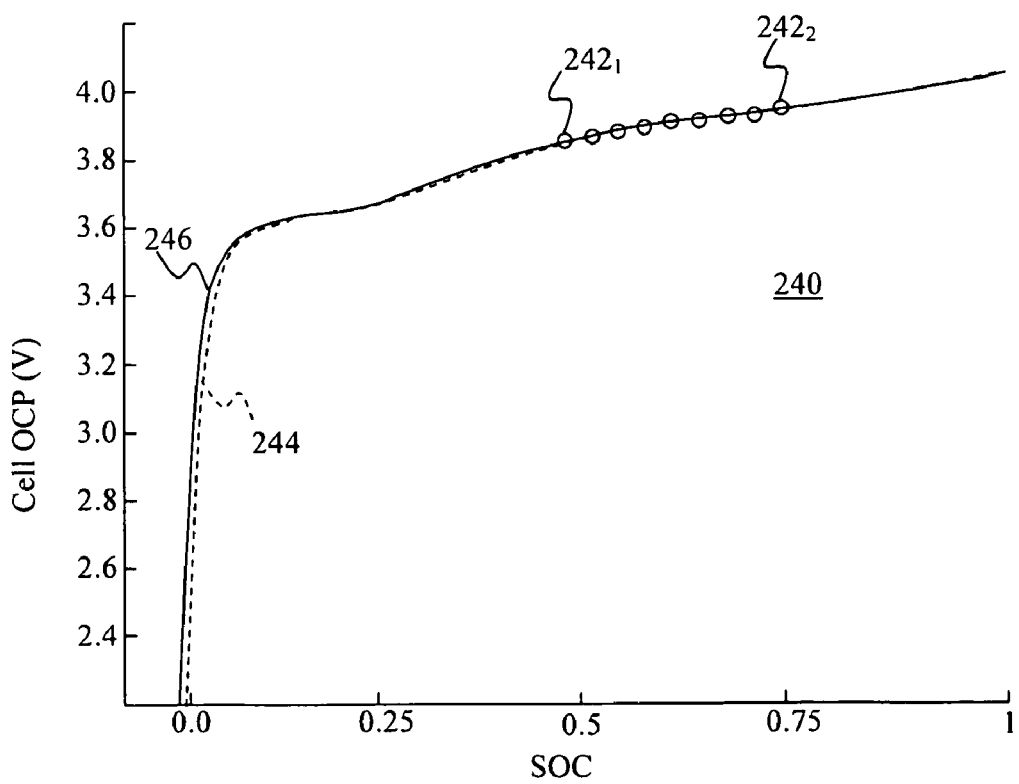
FIG. 4 depicts a graph of the derived $OCP_A/SOC_A$ relationship for the cell using data obtained through the best-fit analysis of FIG. 3 for an exemplary cell along with the modeled $OCP_A/SOC_A$ relationship.

While the example discussed with reference to FIGS. 3 and 4 was directed to a cell with a single active insertion material, the procedure of FIG. 2 may be applied to blended electrodes as well. For blended electrodes, the ratio of active material volume fractions is incorporated as an additional fitting parameter.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A method of determining extent and type of capacity fade of an electrochemical cell comprising:
   identifying a first volume fraction of a first active material in a first electrode at a first time;
   discharging the electrochemical cell from the first time to a second time;
   identifying a first capacity of the first electrode at the second time;
   identifying a second volume fraction of the first active material using a first dimensionless factor (θ), the first dimensionless factor (θ) having a difference between an aged capacity of the electrochemical cell and the first capacity as a numerator and a change in capacity of the first electrode to the first capacity as a divisor;
   identifying a first amount of the first active material lost from the first electrode from the first time to the second time based upon the first volume fraction and the second volume fraction;
   identifying a third volume fraction of a second active material in a second electrode at about the first time;
   identifying a second capacity of the second electrode at about the second time;
   identifying a fourth volume fraction of the second active material based upon the second capacity; and
   identifying a second amount of the second active material lost from the second electrode from about the first time to about the second time based upon the third volume fraction and the fourth volume fraction.

2. The method of claim 1, further comprising:
   identifying a fifth volume fraction of a third active material in the first electrode at about the first time;
   identifying a third capacity of the first electrode at about the second time;
   identifying a sixth volume fraction of the third active material based upon the third capacity; and
   identifying a third amount of the third active material lost from the first electrode from about the first time to about the second time based upon the fifth volume fraction and the sixth volume fraction.

3. The method of claim 1, wherein identifying a first volume fraction comprises identifying a relationship between an open cell potential and a state of charge of the first electrode.

4. The method of claim 3, wherein identifying a third volume fraction comprises identifying a relationship between an open cell potential and a state of charge of the second electrode.

5. The method of claim 4, wherein identifying a third volume fraction comprises:
   identifying an intrinsic thermodynamic relationship between the open cell potential and the state of charge of the second electrode based upon a material property of the second active material.

6. The method of claim 1, further comprising:
identifying a side reaction loss based upon the identified first amount and the identified second amount.

7. The method of claim 1,
wherein the identification of the fourth volume fraction comprises:
determining a second dimensionless factor ($\theta$) based upon the identified second capacity.

8. The method of claim 7, wherein the identification of the second volume fraction comprises:
determining a state of charge of the first electrode using the first dimensionless factor ($\theta$); and wherein the identification of the fourth volume fraction comprises:
determining a state of charge of the second electrode using the second dimensionless factor ($\theta$).

9. A method of determining extent and type of capacity fade of an electrochemical cell comprising:
discharging the electrochemical cell from a first time to a second time;
quantifying a first change in the volume fraction of active material in a negative electrode from the first time to the second time using a first dimensionless factor ($\theta$), the first dimensionless factor ($\theta$) having a difference between an aged capacity of the electrochemical cell and a first capacity of the negative electrode at the second time as a numerator and a change in capacity of the negative electrode to the first capacity as a divisor;
quantifying a second change in the volume fraction of active material in a positive electrode from the first time to the second time;
comparing the first change and the second change; and
determining a side reaction loss based upon the comparison.

10. The method of claim 9, wherein the quantification of the first change comprises:
identifying a first volume fraction of a first active material in the negative electrode;
identifying the first capacity of the negative electrode at time later than the first volume fraction identification; and
identifying a second volume fraction of the first active material based upon the first capacity.

11. The method of claim 10, wherein the quantification of the first change further comprises:
identifying a third volume fraction of a second active material in the negative electrode;
identifying a second capacity of the negative electrode at time later than the third volume fraction identification; and
identifying a fourth volume fraction of the second active material based upon the second capacity.

12. The method of claim 10, wherein the quantification of the second change comprises:
identifying a fifth volume fraction of a third active material in the positive electrode;
identifying a third capacity of the positive electrode at time later than the fifth volume fraction identification; and
identifying a sixth volume fraction of the third active material based upon the third capacity.

13. The method of claim 10, wherein identifying a first volume fraction comprises identifying a relationship between an open cell potential and a state of charge of the negative electrode.

14. The method of claim 13, wherein the quantification of the second change comprises:
identifying an initial relationship between an open cell potential and a state of charge of the positive electrode;
identifying a third capacity of the positive electrode at time later than the initial relationship identification; and
identifying a sixth volume fraction of a third active material based upon the third capacity.

15. The method of claim 14, wherein the identification the initial relationship between an open cell potential and a state of charge of the positive electrode comprises:
identifying an intrinsic thermodynamic relationship between the open cell potential and the state of charge of the positive electrode based upon a material property of the active material in the positive electrode.

16. The method of claim 9, wherein the quantification of the first change comprises:
determining the first dimensionless factor ($\theta$) based upon an identified capacity of the negative electrode; and wherein the quantification of the second change comprises:
determining a second dimensionless factor ($\theta$) based upon an identified capacity of the positive electrode.

17. The method of claim 16, wherein the quantification of the first change comprises:
determining a state of charge of the negative electrode using the first dimensionless factor ($\theta$); and wherein the quantification of the second change comprises:
determining a state of charge of the positive electrode using the second dimensionless factor ($\theta$).

* * * * *